United States Patent [19]

Widmer

[11] Patent Number: 5,273,186
[45] Date of Patent: Dec. 28, 1993

[54] DISPENSING DEVICE FOR LIQUID DETERGENT

[75] Inventor: Fredi Widmer, Wil, Switzerland

[73] Assignee: Unilever Patent Holdings B.V., Vlaardingen, Netherlands

[21] Appl. No.: 908,262

[22] Filed: Jul. 2, 1992

[30] Foreign Application Priority Data

Jul. 4, 1991 [GB] United Kingdom ............... 9114471

[51] Int. Cl.⁵ .......................................... B67D 5/22
[52] U.S. Cl. .......................................... 222/50; 222/82; 222/105; 222/309; 222/325; 222/474
[58] Field of Search ............. 222/309, 325, 472, 474, 222/88, 81, 82, 50, 105

[56] References Cited

U.S. PATENT DOCUMENTS

| | | | |
|---|---|---|---|
| 2,104,990 | 1/1938 | Hoefler | 222/473 X |
| 2,287,216 | 6/1942 | Williams | 222/474 X |
| 2,613,111 | 10/1952 | Freund et al. | 222/474 X |
| 4,976,465 | 12/1990 | Gill et al. | 222/325 X |
| 5,156,299 | 10/1992 | DeCaluwe et al. | 222/82 |

FOREIGN PATENT DOCUMENTS

| | | |
|---|---|---|
| 0321279 | 6/1989 | European Pat. Off. |
| 0362835 | 4/1990 | European Pat. Off. |
| 1118355 | 7/1968 | United Kingdom |
| 2154204 | 9/1985 | United Kingdom |
| 2155117 | 9/1985 | United Kingdom |

*Primary Examiner*—Gregory L. Huson
*Attorney, Agent, or Firm*—Cushman, Darby & Cushman

[57] ABSTRACT

There is provided a rechargeable dispenser device for a liquid detergent product, comprising a removable cartridge (1) and a housing which is provided with a dosing chamber (6) coupled to a pump (7) which is manually movable by way of a rack and pinion system (12) and the stroke of which can be adjusted, whereby the size and shape of the cartridge (1) are such that a pouch containing the liquid detergent product can be fixed into it and that the cartridge with pouch can be tightly fixed in the housing so as to ensure an open but non-leaking connection between the detergent in the pouch and the dosing chamber, by way of an output nozzle of the pouch. This dispenser is particularly useful for accurately dosing concentrated liquid detergent products intended for hard surface cleaning, for instance in excess water.

8 Claims, 3 Drawing Sheets

DISPENSING DEVICE FOR LIQUID DETERGENT

FIELD OF THE INVENTION

The present invention relates to a rechargeable dispensing device for a liquid detergent product and more particularly to a dispensing device whereby controlled quantities of material can be accurately dispensed from a pouch containing the liquid detergent. The invention also relates to a pouch filled with a liquid detergent product which is especially adapted to be used in the dispensing device of the invention by way of a cartridge into which it can be fixed. The invention is particularly useful for accurately dosing concentrated liquid detergent products intended for hard surface cleaning, for instance in excess water.

PRIOR ART AND BACKGROUND OF THE INVENTION

Rechargeable dispensing devices for liquid detergent products and other liquid products are known in the art. U.S. Pat. No. 3,758,005 discloses a rechargeable dispenser comprising a pistol-shaped grip and actuator as well as a housing containing a measuring chamber provided with an inlet and an outlet valve and coupled to a piston pump. The stroke of said pump can be adjusted by turning a stop member so that the volume to be dosed can be varied. However, this adjustment can only be carried out for a restricted number of dosing volumes to be dispensed. Furthermore, this dispenser does not comprise a separate cartridge into which a pouch can be fixed. EP-A-173 885 discloses a liquid soap dispenser comprising a chamber to which a refill cartridge can be connected, and a piston pump provided with a stopping mechanism so as to adjust the piston stroke and thus the resulting soap volume to be dispensed. However, this wall-mounted type of dispenser can only be used to dose small amounts of soap by manually operating the piston pump. The reason is that the dispenser does not contain a rack and pinion system coupled to the actuator for the piston pump. U.S. Pat. No. 4,662,195 and U.S. Pat. No. 4,437,585 disclose similar types of wall-mounted dispensers.

It is an object of the present invention to provide a rechargeable dispensing device for a liquid detergent product, which is to be used for hard surface cleaning, which can be operated with one hand and which is designed such that the volume to be dispensed can be accurately adjusted.

It is another object of the present invention to provide a dispensing device which is designed such that a wide but practical range of liquid detergent volumes can be adjusted.

It was found that these and other objects can be achieved by a dispenser device according to the present invention.

SUMMARY OF THE INVENTION

The invention provides a rechargeable dispenser device for a liquid detergent product, comprising a removable cartridge and a housing which is provided with a dosing chamber coupled to a pump which is manually movable by way of a rack and pinion system and the stroke of which can be adjusted, whereby the size and shape of the cartridge are such that a pouch containing the liquid detergent product can be fixed into it and that the cartridge with pouch can be tightly fixed in the housing so as to ensure an open but non-leaking connection between the detergent in the pouch and the dosing chamber, by way of an output nozzle of the pouch.

The invention also provides a cartridge into which a pouch filled with a liquid detergent product can be fixed, which cartridge is adapted to be used in the dispenser device according to the invention. The invention finally provides a pouch filled with a liquid detergent product which is adapted to be used in this cartridge.

DETAILED DESCRIPTION OF THE INVENTION

The dispensing device according to the invention is not only rechargeable, practical, manually operable with one hand, and accurately adjustable over a wide range of dosing volumes, but also unique in that it is only suitable for use with certain special types of cartridges and pouches.

In order to fix the pouch to the cartridge, the cartridge could contain sliding elements into which the sides of the pouch are placed. Alternatively, the cartridge could contain two similar parts of which one contains projections and the other contains holes at corresponding locations such that a pouch can be fixed in between these parts. However, for practical reasons these two parts are peferably shaped such that a pouch which is adapted to the internal shape thereof can be tightly located in between them without having to use specific fixation elements. It is, furthermore, preferred that the pouch when located inside the cartridge remains visible so that it can be seen what type of detergent is applied. Therefore, cartridges with transparent parts are desirably used. The cartridge may be fixed into the housing of the dispenser by any means which ensures that an open and non-leaking connection between the detergent in the pouch and the dosing chamber is established. However, for practical reasons it is preferred that the cartridge and housing contain elements so as to provide a quick and tight snapping fixation. Furthermore, it was found that the above mentioned open non-leaking fixation could be best obtained by providing the housing with a hollow needle which is situated such that a membrane in an output nozzle of the pouch is pierced by the hollow needle when the cartridge containing the pouch is fixed into the housing. A tight non-leaking fixation is important in order to prevent spillage of and skin contact with the detergent product which is usually in concentrated form.

The dispenser device could be made wall-mounted or portable. For practical reasons, the device is preferably a portable device whereby the cartridge is provided with a handle for carrying the device.

In order to make the dispenser device accurately adjustable, the pump is preferably a piston pump provided with a stop element which cooperates with a rod carrying the piston. The stop element is adjustable in the axis direction of the piston between predetermined limits so as to restrict the stroke of the piston. Furthermore, the housing of the device preferably contains a display showing a value of the adjusted amount of detergent product to be dispensed from out of the dosing chamber.

When the dispenser is operated, i.e. when the pump pushes the adjusted amount of liquid detergent out of the dosing chamber, it should obviously be prevented that some of this liquid detergent flows back into the pouch. Therefore, a spring-loaded valve is preferably located inside the connecting piece between the dosing chamber and the pouch. Said valve is installed such that it closes when the dispenser is operated and that it opens when the dosing chamber is filled with liquid detergent flowing out of the pouch.

As the dispenser should be practical and preferably operable with one hand, there is a maximum limit as regards the amount of detergent product to be dosed. Therefore, the volume of the dosing chamber is preferably adjustable in between 5 and 100 ml, more preferably in between 5 and 50 ml.

For the same reason, the volume of the pouch filled with liquid detergent is preferably in the range of from 100 ml. to 10 litres, more preferably in the range of from 250 ml. to 5 litres.

For practical reasons, the volume of the dosing chamber is preferably adjustable in gradations of 5 ml. The dispensing device according to the invention contains a rack and pinion system which is connected to the piston pump on one side and to a manually operable handle on the other side, in order to be able to manually dose the above-mentioned preferred range of dosing volumes.

BRIEF DESCRIPTION OF THE DRAWINGS

The invention is illustrated by FIGS. 1-4, of which.

Figure 1:
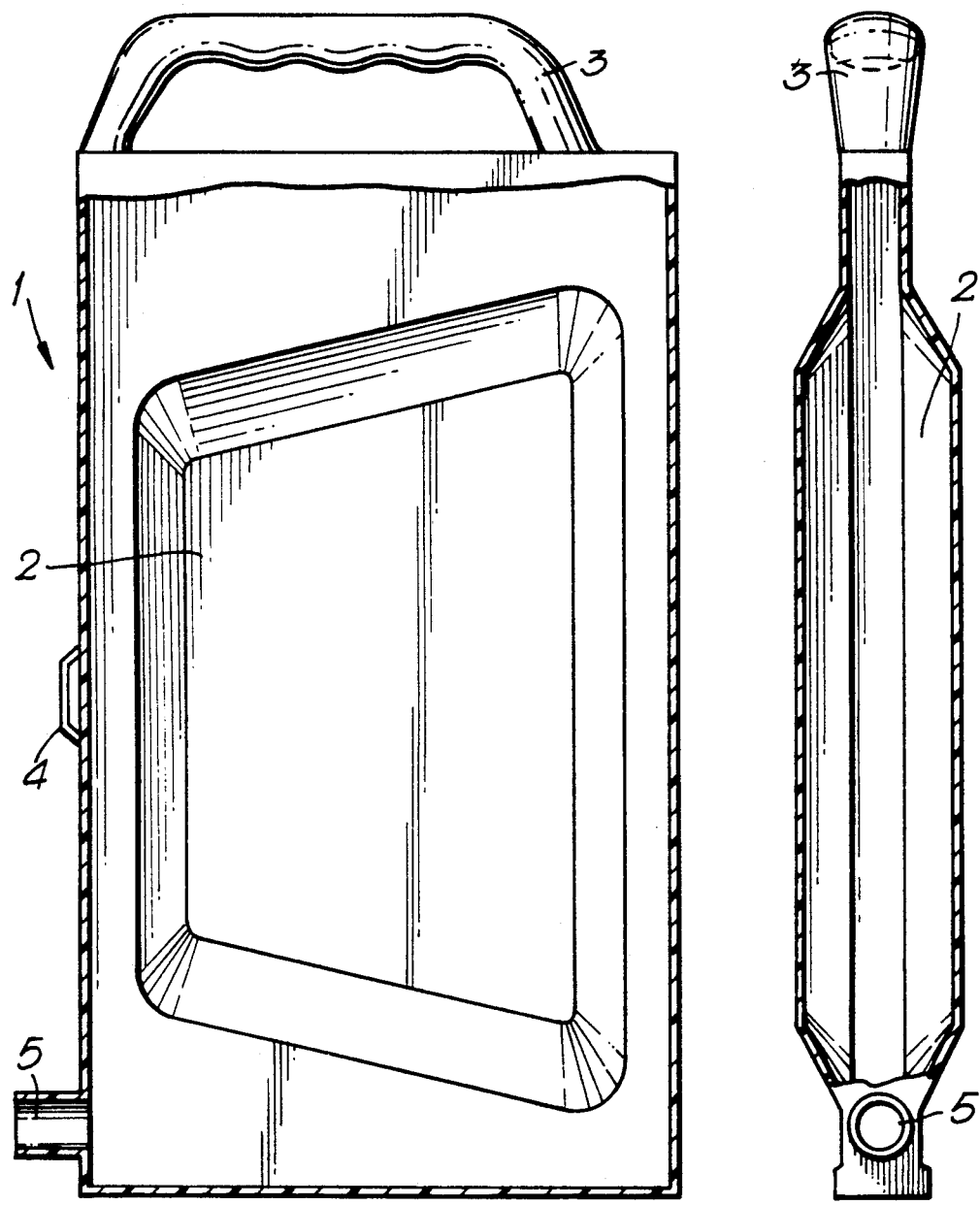
FIG. 1 shows a schematic drawing of a cross-section of a cartridge according to the invention.

Referring in detail to these drawings, in FIG. 1 (1) indicates the cartridge into part (2) of which a pouch adapted to the shape thereof and filled with detergent material can be fixed. On the upper side of the cartridge a handle (3) is situated in order to make the cartridge as well as the dispensing device in which it is to be fixed, portable. With the element (4) a quick and tight snapping fixation of the cartridge with the dispensing device can be established. In the element (5) the output nozzle of the pouch is to be placed.

Figure 2:
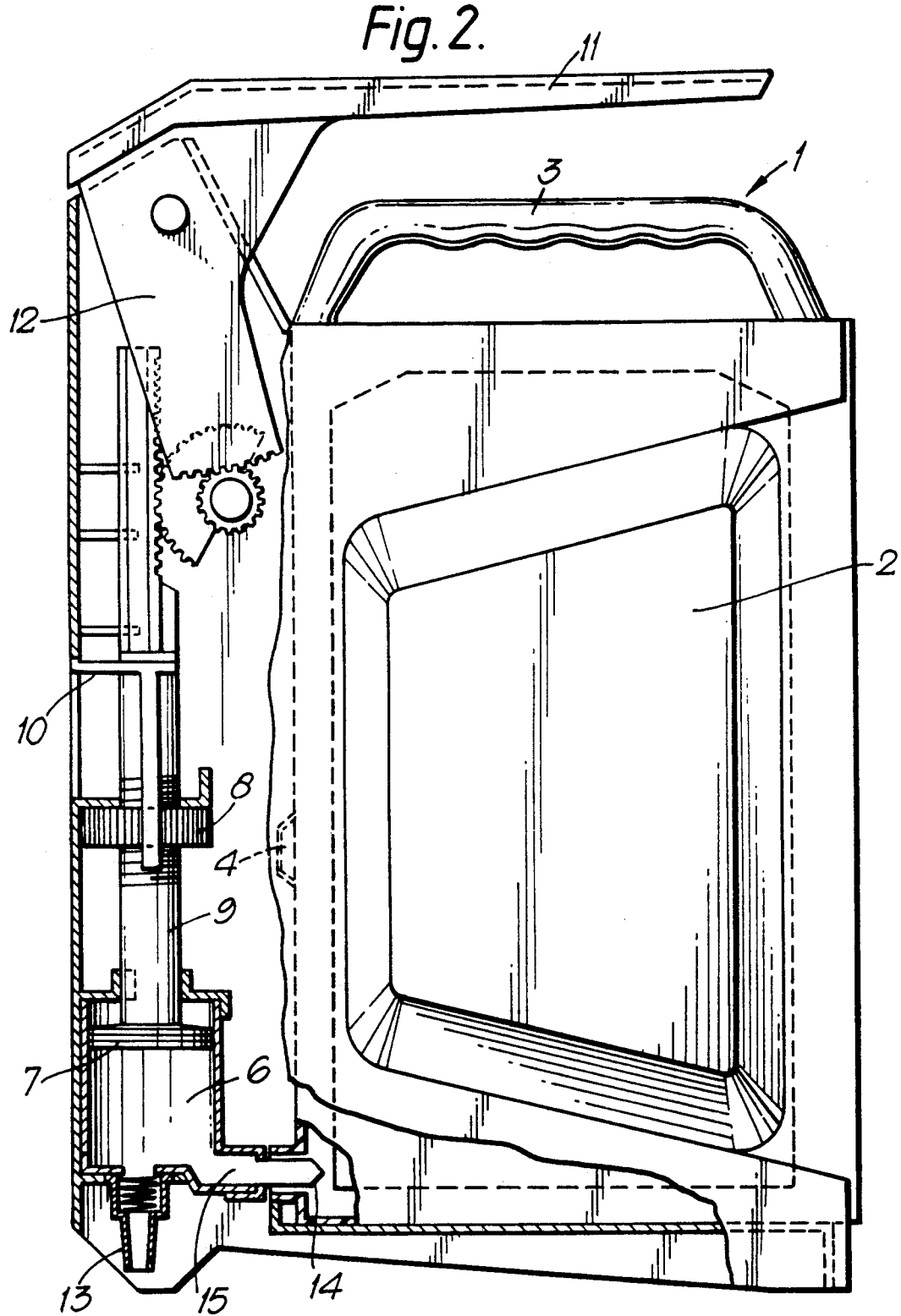
FIG. 2 shows a schematic drawing of a cross-section of the dispensing device according to the invention, including the cartridge.

In FIG. 2, a dispensing device is shown into which the cartridge of FIG. 1 is fixed with the snapping element (4). In this drawing also the dosing chamber (6) and the piston (7) which is situated inside this chamber, are shown. The stroke of this piston (7) can be adjusted by means of stop element (8). This stop element (8) cooperates with a rod (9) to which the piston is connected. The adjusted amount of detergent product in the dosing chamber is displayed by indicator (10). The volume to be dosed is pushed out of the device by pressing handle (11) which forces the piston to move down by way of the rack and pinion system (12). As a result, the adjusted detergent product volume is pushed out of the dispenser device through output nozzle (13), which nozzle is preferably a spring-loaded nozzle. When the cartridge (1) is fixed into the housing of the dispenser device, the dosing chamber (6) may be connected to the internal volume of the detergent containing pouch by way of a needle (14) which pierces a membrane in the output nozzle of the pouch. The connecting piece between dosing chamber and pouch (15) is preferably equipped with a spring loaded valve. This valve closes when the adjusted amount of liquid detergent is pushed out of the dosing chamber so as to prevent detergent liquid from flowing back into the pouch.

Figure 3:
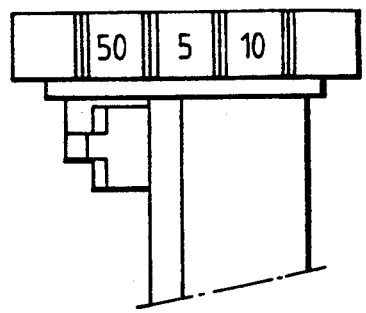
FIG. 3 shows a schematic view of the indicator displaying a value of the adjusted amount of detergent product to be dosed.

In FIG. 3, the indicator (10) diplaying a value of the adjusted amount of detergent product to be dispensed from the dosing chamber, is schematically drawn.

Figure 4:
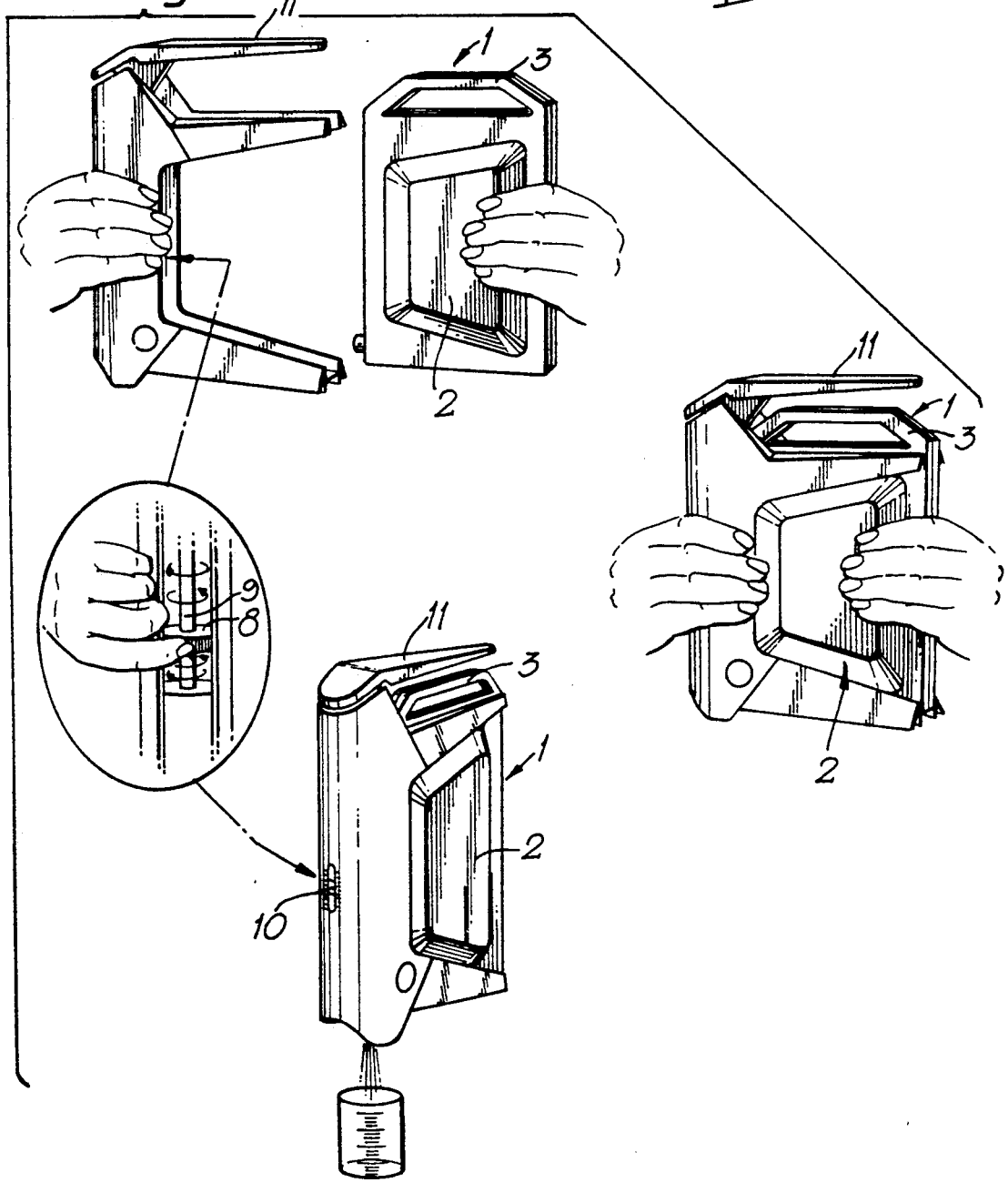
FIG. 4 shows schematically the ways in which the cartridge is fixed into the housing of the device and in which the dispensing device is adjusted.

In FIG. 4, it is shown how the cartridge (1) containing the pouch is fixed into the housing of the dispensing device. Also the adjustable stop element (8) which cooperates with the rod (9) carrying the piston is indicated and it is shown that the stroke of the piston can be adjusted by manually turning this stop element. The adjusted amount of detergent is shown on the front side of the housing of the device by indicator (10).

I claim:

1. A dispensing device for a liquid detergent product comprising:
   a removable cartridge;
   a pouch containing the liquid detergent product being coupled to said cartridge; and
   a housing assembly, said housing assembly including:
      surfaces defining a dosing chamber;
      an output nozzle coupled to at least one said surface defining said dosing chamber;
      a pump cooperating with said dosing chamber;
      a rack and pinion system operatively coupled to said pump; and
      a handle member operatively coupled to said rack and pinion system;
   said cartridge, with said pouch coupled thereto, being sealingly fixed within said housing so that the liquid detergent product in said pouch communicates with said dosing chamber, movement of sand handle member moving said rack and pinion system and thus operating said pump to a dispense the liquid detergent product from said output nozzle.

2. Dispenser device according to claim 1 wherein the cartridge contains two similar parts which are shaped such that said pouch, adapted to the internal shape of the cartridge, can be tightly fixed between said parts.

3. Dispenser device according to claim 1 wherein the housing and the cartridge contain elements so as to provide a quick and tight snapping fixation between the cartridge and the housing.

4. Dispenser device according to claim 1 wherein the housing is provided with a hollow needle which is situated such that a membrane of the pouch is pierced thereby when the cartridge with the pouch is tightly fixed into the housing.

5. Dispenser device according to claim 1 wherein the device is portable and the cartridge is provided with a handle for carrying the device.

6. Dispenser device according to claim 1 wherein the pump is a piston pump provided with a stop element which cooperates with a rod carrying the piston, the stop element being adjustable in the axis direction of the piston pump between predetermined limits so as to adjust a stroke of the piston.

7. Dispenser device according to claim 6, wherein the stop element is connected with means for indicating a value of an amount of detergent product to be dispensed from the dosing chamber.

8. Dispenser device according to claim 6, wherein a volume of the dosing chamber is adjustable between 5 and 100 ml.

* * * * *